(12) United States Patent
Samar

(10) Patent No.: US 7,210,037 B2
(45) Date of Patent: Apr. 24, 2007

(54) METHOD AND APPARATUS FOR DELEGATING DIGITAL SIGNATURES TO A SIGNATURE SERVER

(75) Inventor: Vipin Samar, Cupertino, CA (US)

(73) Assignee: Oracle International Corp., Redwood Shores, CA (US)

(*) Notice: Subject to any disclaimer, the term of this patent is extended or adjusted under 35 U.S.C. 154(b) by 853 days.

(21) Appl. No.: 09/741,691

(22) Filed: Dec. 15, 2000

(65) Prior Publication Data

US 2002/0078355 A1 Jun. 20, 2002

(51) Int. Cl.
*H04L 9/00* (2006.01)

(52) U.S. Cl. ............ 713/176; 713/175; 713/156; 380/30; 380/277

(58) Field of Classification Search ............ 713/176, 713/156, 175; 380/280, 279, 277, 30; 705/75, 705/71, 67; 707/9–10
See application file for complete search history.

(56) References Cited

U.S. PATENT DOCUMENTS

| 6,023,509 | A |   | 2/2000  | Herbert et al. ............ 380/25 |
| 6,073,242 | A | * | 6/2000  | Hardy et al. ............ 713/201 |
| 6,233,577 | B1| * | 5/2001  | Ramasubramani et al. .... 707/9 |
| 6,237,096 | B1| * | 5/2001  | Bisbee et al. ............ 713/178 |
| 6,253,323 | B1| * | 6/2001  | Cox et al. ............ 713/176 |
| 6,308,277 | B1| * | 10/2001 | Vaeth et al. ............ 713/201 |
| 6,363,479 | B1| * | 3/2002  | Godfrey et al. ............ 713/160 |
| 6,370,249 | B1| * | 4/2002  | Van Oorschot ............ 380/277 |
| 6,513,116 | B1| * | 1/2003  | Valente ............ 713/155 |
| 6,643,774 | B1| * | 11/2003 | McGarvey ............ 713/155 |
| 6,829,712 | B1| * | 12/2004 | Madoukh ............ 713/200 |
| 6,853,988 | B1| * | 2/2005  | Dickinson et al. ............ 705/75 |
| 2003/0135740 | A1| * | 7/2003 | Talmor et al. ............ 713/186 |
| 2004/0049687 | A1| * | 3/2004 | Orsini et al. |

FOREIGN PATENT DOCUMENTS

| EP | 1 030 282   | 8/1997 |
| EP | 0 803 789   | 10/1997 |
| WO | WO 97/50205 | 12/1997 |
| WO | WO 99/05814 | 2/1999 |

* cited by examiner

*Primary Examiner*—Kim Vu
*Assistant Examiner*—Linh L D Son
(74) *Attorney, Agent, or Firm*—Park, Vaughan & Fleming LLP

(57) ABSTRACT

One embodiment of the present invention provides a system that facilitates delegating operations involved in providing digital signatures to a signature server. The system operates by receiving a request for a digital signature from a user at the signature server, wherein the request includes an item to be signed on behalf of the user by the signature server. In response to the request, the system looks up a private key for the user at the signature server, and signs the item with the private key. Next, the system returns the signed item to the user, so that the user can send the signed item to the recipient. In one embodiment of the present invention, the system authenticates the user prior to signing the item. In one embodiment of the present invention, the system determines whether the user is authorized to sign the item prior to signing the item.

18 Claims, 4 Drawing Sheets

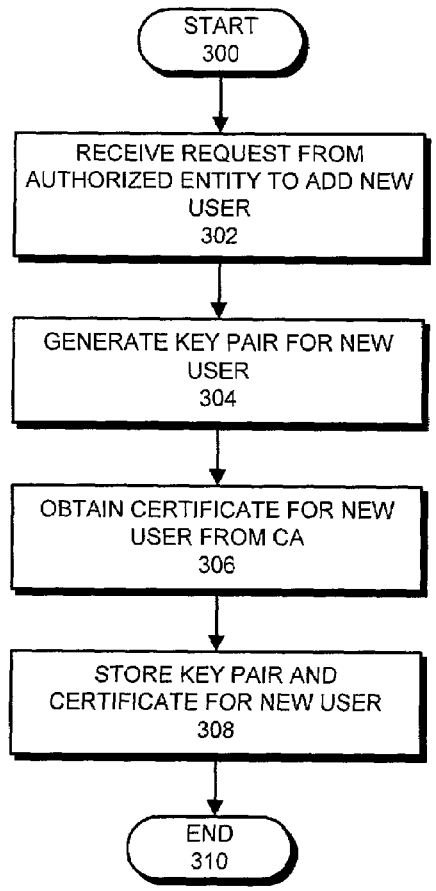
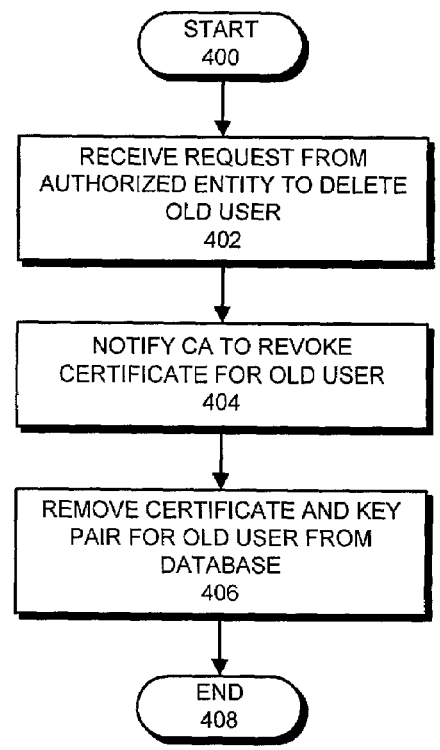
FIG. 3
FIG. 4

METHOD AND APPARATUS FOR DELEGATING DIGITAL SIGNATURES TO A SIGNATURE SERVER

BACKGROUND

1. Field of the Invention

The present invention relates to providing security in distributed computer systems. More specifically, the present invention relates to a method and an apparatus for delegating operations involved in providing digital signatures to a digital signature server.

2. Related Art

Digital signatures have the potential to revolutionize electronic commerce. By using digital signatures it is possible to provide support for non-repudiation of transactions that take place across a network. It is also possible to facilitate strong authentication between unknown parties in a transaction.

In spite of all of the strong assurances digital signatures provide through complex mathematical operations, practical deployment of digital signatures is not able to provide the same functionality as notarized paper and pen based signatures. Digital certificates are not easy to create, not easy to understand, and not easy to use for most people. Consequently, people do not understand how to protect their keys, how to facilitate revocation, or how to carry digital certificates with them when they travel.

Besides getting the initial certificate, the user also has to worry about certificate expiry, certificate removal, self-identification, time of certificate issuance, the appropriate key size for the given application, and selecting between the different certificates that the user may acquire from different places. In this case, the problem becomes very similar to the problem of remembering and selecting the appropriate password for different applications.

Furthermore, if people change their roles within a company, the current model requires the existing certificate to be revoked because the existing certificate was attached to a certain authorization level. Because people frequently change their roles, this can increase the overhead of the public key infrastructure (PKI) management system.

It is also desirable to associate some type authorization with digital certificates. For example, just because an employee is in possession of a certificate does not mean the employee should be able to order $100,000 worth of goods.

It is additionally desirable to be able to use certificates to delegate powers at appropriate times. For example, if the CEO of a company is traveling, the CEO may want to delegate some of his powers to his secretary or to a Vice President, but only for a limited time and only for limited capabilities. Note that it is impractical to push decision-making processes and enforcement of business rules to an application server because the application server may reside outside of the company.

Today, authorization is controlled by the application server, which means that the authorization database at the remote server has to be kept up to date with changes within the enterprise. Controlling authorization at the application server is error-prone, and the application server is difficult to keep in sync all the time. Furthermore, a person's authorization changes not only when the person leaves the company, but also when the person's role changes within the company. Even, when the person's role does not change within the company, some of the person's authorization levels may change.

Furthermore, if an employee is fired, a company would ideally like to revoke any certificates held by the employee immediately. This revocation is presently accomplished by pushing the problem back to the application. Because of the complex revocation process, very few applications implement certificate revocation, and thus transactions remain exposed to certificate misuse.

There is also the problem of supporting multiple people with the same role. For example, a company may have a number of purchasing officers. In this case, application services are not so much interested in which specific purchasing officer bought their improvement, but whether the request was made by a purchasing officer of the company. Also, as multiple people come and leave this specific job, the certificate has to be kept valid.

Companies are additionally concerned that a certificate and corresponding private key may be stolen from a user's desktop.

What is needed is a method and an apparatus for facilitating the use of digital signatures that is relatively free of the above-described difficulties.

SUMMARY

One embodiment of the present invention provides a system that facilitates delegating operations involved in providing digital signatures to a signature server. The system operates by receiving a request for a digital signature from a user at the signature server, wherein the request includes an item to be signed on behalf of the user by the signature server. In response to the request, the system looks up a private key for the user at the signature server, and signs the item with the private key. Next, the system returns the signed item to the user, so that the user can send the signed item to the recipient.

In one embodiment of the present invention, the system authenticates the user prior to signing the item.

In one embodiment of the present invention, the system determines whether the user is authorized to sign the item prior to signing the item. In a variation on this embodiment, this involves looking up an authorization for the user based upon an identifier for the user as well as an identifier for an application to which the user will send the signed item. In a variation on this embodiment, the system determines whether the user is authorized to sign the item by communicating with an authority server that is separate from the signature server.

In one embodiment of the present invention, upon receiving a request from an authorized entity to add a new user, the system generates a key pair for the new user. This key pair includes a new user private key and a new user public key. Next, the system communicates with a certification authority to obtain a certificate for the new user based on the key pair. The system then stores the certificate and the key pair for the new user in a location that is accessible by the signature server to enable the signature server to sign items on behalf of the new user.

In one embodiment of the present invention, upon receiving a request from an authorized entity to delete an old user, the system notifies a certification authority to revoke a certificate for the old user. The system also removes the private key for the old user from the signature server, so that the signature server can no longer sign items on behalf of the old user.

In one embodiment of the present invention, the system additionally archives the request and the signed item at the signature server either directly, or by sending the signed item to an archive server. Note that in current PKI implementations, there is no central repository for signed documents. Thus, if an employee leaves the company, or if the employee's machine crashes, there is no evidence left about what was signed by the employee. The signature server thus facilitates a centralized repository for signed transactions.

Also note that the present invention keeps the authorization functions within the organization instead of pushing the authorization functions out to an application server, which may reside outside the organization.

BRIEF DESCRIPTION OF THE FIGURES

FIG. 3 illustrates the process of initializing a key for a user at a signature server in accordance with an embodiment of the present invention.

FIG. 4 illustrates the process of deleting a user from a signature server in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computer System

Figure 1:
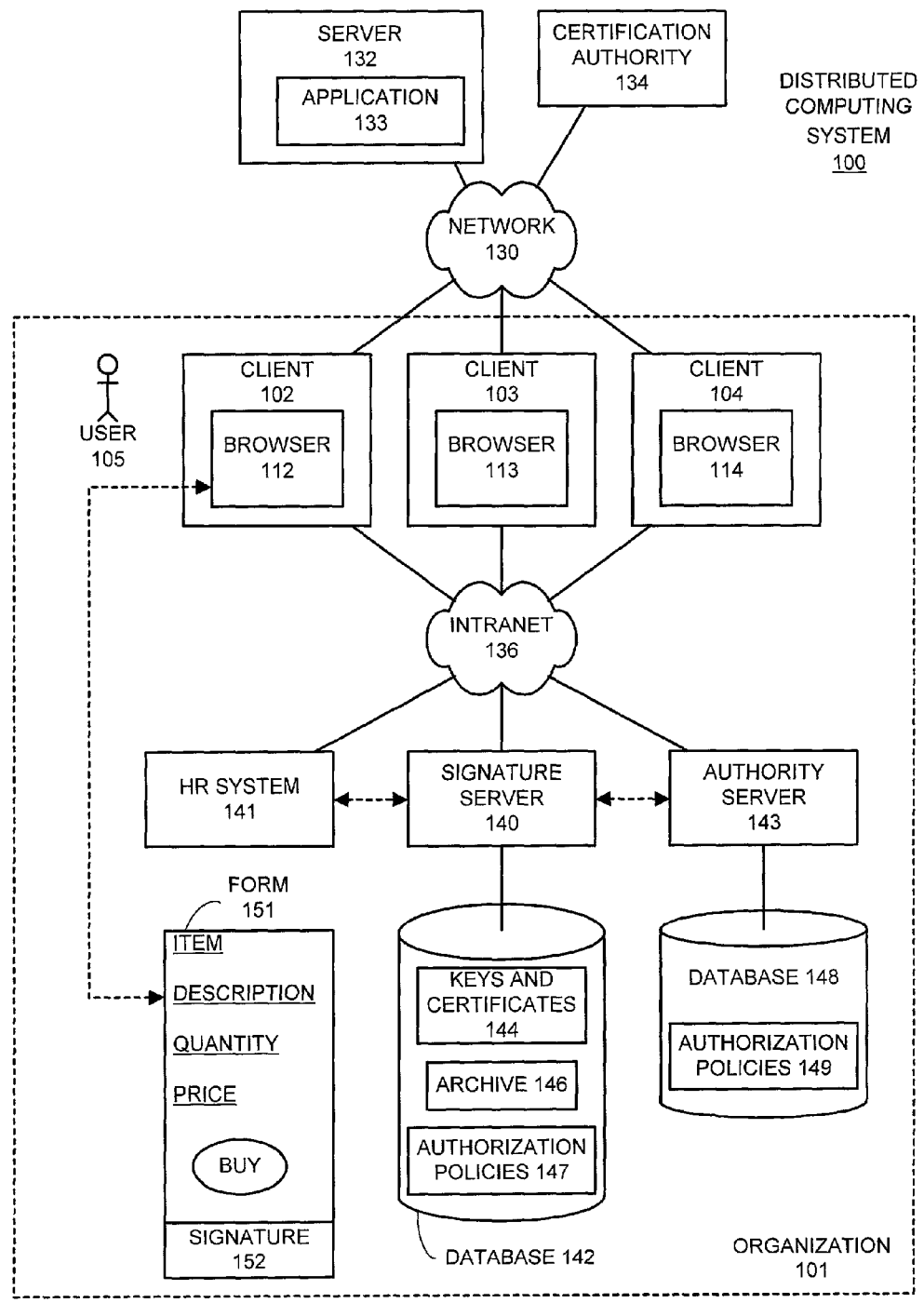
FIG. 1 illustrates a distributed computer system in accordance with an embodiment of the present invention.

FIG. 1 illustrates a distributed computing system 100 in accordance with an embodiment of the present invention. Distributed computing system 100 includes network 130, which couples together server 132, certification authority 134, signature server and clients 102–104.

Network 130 can generally include any type of wire or wireless communication channel capable of coupling together computing nodes. This includes, but is not limited to, a local area network, a wide area network, or a combination of networks. In one embodiment of the present invention, network 130 includes the Internet.

Server 132 can generally include any computational node including a mechanism for servicing requests from clients 102–104 for computational and/or data storage resources. Server 132 includes an application with which clients 102–104 communicate. During some of these communications, clients 102–104 send data items to application 133, wherein the data items are digitally signed as is discussed below with reference to FIGS. 2–5.

Signature server 140 can generally include any computational node including a mechanism for servicing requests from clients 102–104 to perform operations related to digital signatures. Signature server 140 includes a database 142 for storing keys and certificates 144 related to digital signatures, as well as an archival store 146 for storing a record of operations performed by signature server 140. Database 142 can also store authorization policies 147 for signature server 140.

Note that a digital signature is typically created by "signing" a data item with a private key belonging to a user. This signature can then be verified with a corresponding public key belonging to the user. This public key is typically propagated within a "certificate" that is signed by a chain of one or more certification authorities leading to a trust anchor.

Certification authority 134 is an independent entity that verifies the identity of users and grants credentials for use by various entities coupled to network 130.

Note that providing security for signatures in signature server 140 can be accomplished through the same mechanisms that are used to provide security in a certification authority. For example, this may involve encrypting private keys so they cannot be easily stolen from signature server 140. Also note that it is generally easier to protect keys stored within a single signature server than information distributed throughout computer systems on intranet 136.

Clients 102–104 can generally include any node on a network including computational capability and including a mechanism for communicating across network 130. Clients 102–104 include browsers 112–114, which can generally include any type of web browser capable of viewing a web site, such as the INTERNET EXPLORER™ browser distributed by the Microsoft Corporation of Redmond, Wash.

Client 102 is operated by a user 105 and receives a form 151 from server 132. Form 151 includes a number of fields, including an identifier for an item, a description, a quantity and a price. Form 151 additionally includes a "buy" button, which can be selected by user 105 to buy the item. Form 151 additionally includes a placeholder for signature 152, which is later generated by using a private key belonging to user 105 to sign form 151. Note that signature 152 is created by signature server 140.

Intranet 136 couples together a number of entities belonging to organization 101, including clients 102–104, signature server 140, human resources (HR) system 141 and authority server 143.

Intranet 136 can generally include any type of wire or wireless communication channel capable of coupling together computing nodes within organization 101. This includes, but is not limited to, a local area network, a wide area network, or a combination of networks. Note that organization 101 can include any type of organization, such as a corporation or a government agency.

HR system 141 is operated by a human resources department within an organization. An authorized person using HR server 141 can issue commands to signature server 140 to initialize keys for a new member of organization 101, or to remove an entry for a member who leaves organization 101.

Authority server 143 is used to keep track of which members of organization 101 are authorized to sign using specific signatures. For example, the officers of a corporation may be authorized to sign with a private key for the corporation, whereas other employees of the corporation may only be able to sign with their own private keys. Note that authority server 143 may also have a database 148 for storing authorization policies 149.

Alternatively, signature server 140 can itself store some authorization policy information, or signature server 140 can access authorization policy information from some other central repository or a directory service, such as a director service implemented through the lightweight directory access protocol (LDAP).

Process of Creating a Digital Signature

Figure 2:
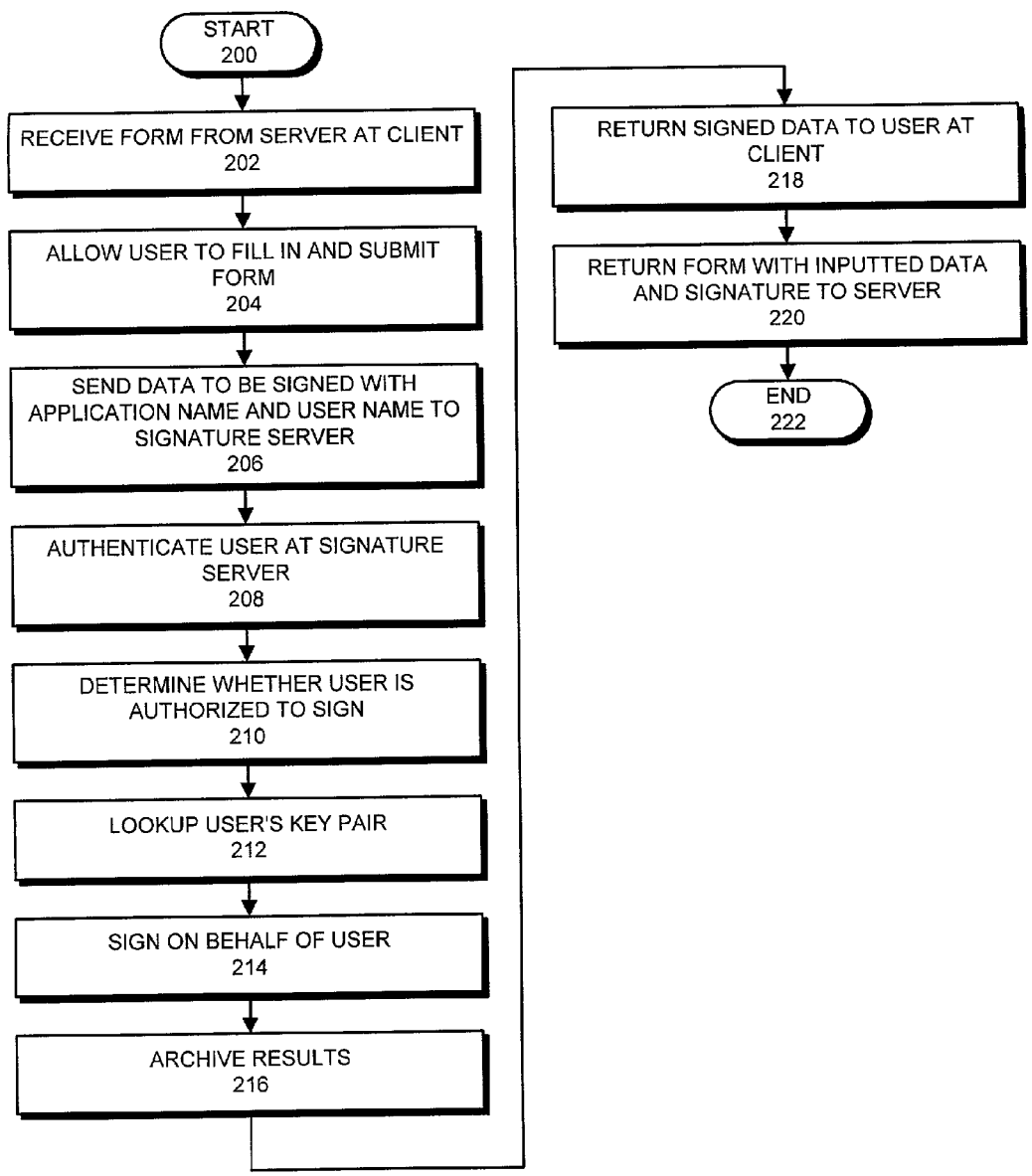
FIG. 2 illustrates the process of creating a digital signature through a signature server in accordance with an embodiment of the present invention.

FIG. 2 illustrates the process of creating a digital signature through signature server 140 in accordance with an embodiment of the present invention. First, client 102 receives a form 151 from application 133 within server 132 (step 202). Client 102 then allows user 105 to fill in form 151, and to submit form 151 (step 204). Next, client 102 sends form 151 along with an identifier for application 133 and an identifier for user 105 to signature server 140 (step 206).

Next, signature server 140 authenticates user 105 by using any one of a number of well-known authentication techniques, such as by using the secure sockets layer (SSL) protocol with client side authentication, by using a password, by using a secure identifier, or by using a one-time password (step 208).

Once user 105 is authenticated, the system determines whether user 105 is authorized to sign form 151 (step 210). This may involve communicating with a separate authority server 143, which accesses a set of rules or a policy to determine whether user 105 is authorized to sign form 151 with a specific private key. Another option is to allow signature server 140 to refer to its own database 142 or to a directory service such as LDAP or X.500 to retrieve authorization information. Note that the authority need not be limited to specifying which forms the user can sign, but can also specify the limits under which the user can sign within a given form. For example, a user may only be allowed to sign transactions up to a $5000 limit.

Next, signature server 140 looks up the user's key pair in database 142 (step 212). This may involve selecting an appropriate key pair to use based upon the identifier for user 105 and an identifier for application 133. For example, a key pair belonging to user 105 may be selected for applications 133, and a key pair belonging to organization 101 may be used for other applications. It is also possible to share the same key pair amongst multiple users.

Signature server 140 then signs form 151 on behalf of user 105 (step 214), and optionally archives the result of the signing in database 142 (step 216).

Next, signature server 140 returns the signed form 151 to user 105 on client 102 (step 218). This allows user 105 to return to form, complete with inputted data and signature to application 133 on server 132 (step 220).

Process of Initializing a Signature Key for a User

FIG. 3 illustrates the process of initializing a key for user 105 at signature server 140 in accordance with an embodiment of the present invention. The system starts by receiving a request for an authorized entity to add a new user to signature server 140 (step 302). For example, an HR representative operating HR server 141 can submit a request to add a new employee to signature server 140. Signature server 140 then generates a new private key/public key pair for the new user (step 304). Next, signature server 140 communicates with certification authority 134 to obtain a certificate for the new public key (step 306). Finally, signature server 140 stores the key pair and the certificate for the new user in database 142 (step 308). This enables signature server 140 to subsequently sign data items on behalf of the new user.

Note that the user also has to be notified somehow about the password for this particular signature key. Moreover, one of the advantages of associating the user password not with the signature key itself, but instead with the ability to access to the signature key through signature server 140, is that if the user forgets the password, the corresponding certificate need not be revoked. The user can simply be given a new password, and life continues as before. Without such an association, the certificate has to be revoked, and the user has to obtain a new certificate by following the expensive provisioning process of PKI.

Process of Deleting a User from a Signature Server

FIG. 4 illustrates the process of deleting a user from a signature server in accordance with an embodiment of the present invention. The system starts by receiving a request for an authorized entity to remove a user from signature server 140 (step 402). For example, an HR representative operating HR server 141 can submit a request to remove user 105 from signature server 140 when user 105 leaves organization 101. Signature server 140 then notifies certification authority 134 to revoke the certificate for user 105 (step 404). This typically involves adding the certificate to a certificate revocation list. Next, signature server 140 removes the private key for user 105 from database 142 (step 406). Note that this ensures that the private key for user 105 can no longer be used by user 105, because user 105 never actually accessed the private key before it was deleted.

Process of Delegating Certificate Verification to a Signature Server

Figure 5:
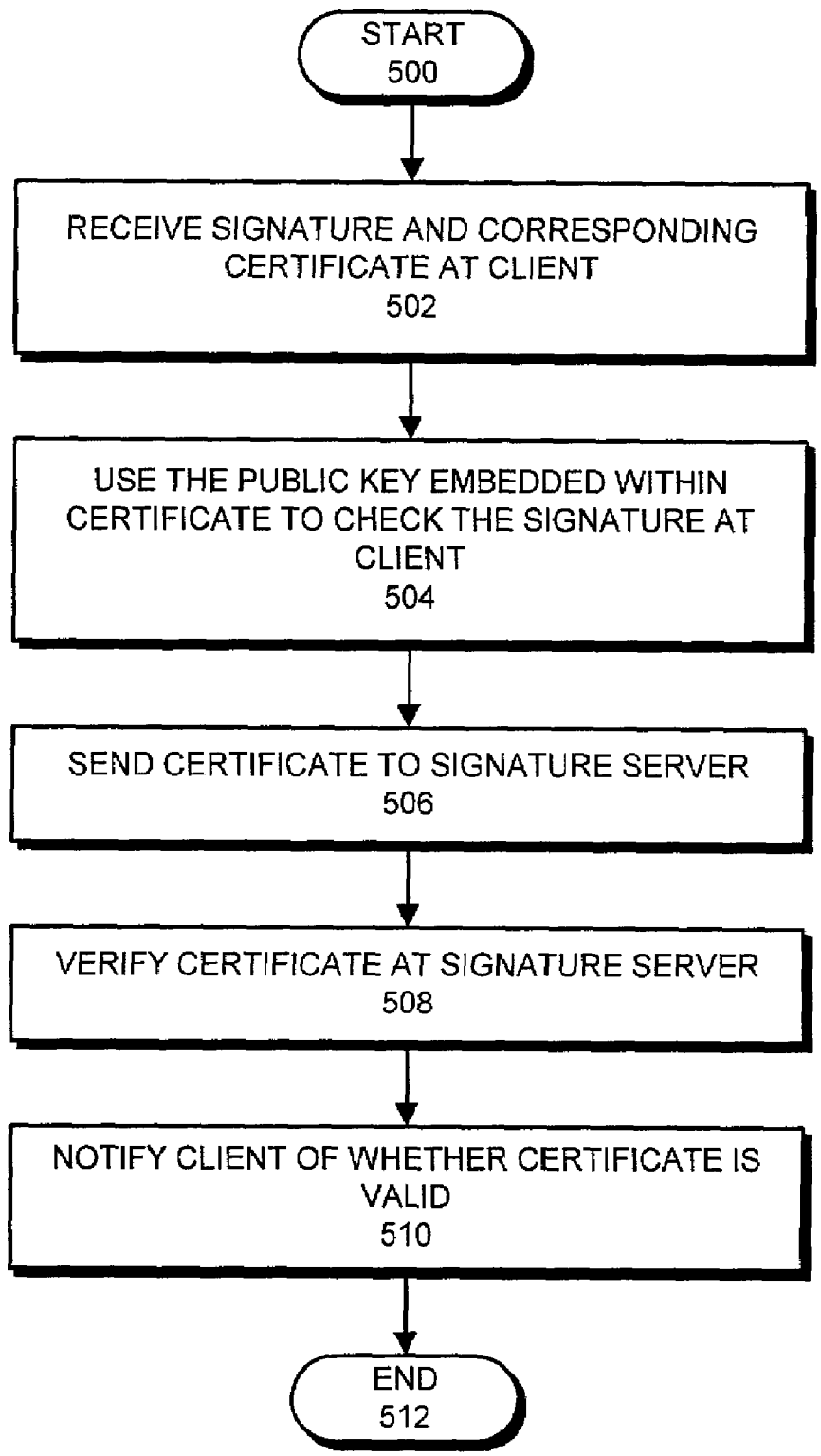
FIG. 5 illustrates the process of delegating certificate verification to a signature server in accordance with an embodiment of the present invention.

FIG. 5 illustrates the process of delegating the certificate verification to signature server 140 in accordance with an embodiment of the present invention. During this process, client 102 receives a data item along with a corresponding signature and a corresponding certificate (step 502). Client 102 then uses the public key embedded within the certificate to check the signature (step 504), and subsequently sends the certificate to signature server 140 to verify the certificate (step 506). Next, signature server 140 verifies the certificate by communicating with certification authority 134, if necessary, to determine whether the certificate has been revoked (step 508). Finally, signature server 140 notifies client 102 of whether or not the certificate is valid (step 510). Note that above-described process facilitates delegating the certificate revocation checking mechanism and the policy enforcement mechanism to a centralized server instead of depending upon each individual client machine associated with the enterprise.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating the delegation of operations involved in providing digital signatures to a signature server, the method comprising:
   allowing a user to authenticate the signature server prior to sending a message to the signature server;
   receiving the message from the user at the signature server, the message including an item to be signed on behalf of the user by the signature server, a user identifier which identifies the user, and an application identifier which identifies the application being used;
   authenticating the user at the signature server;
   determining whether the user is authorized to request a signature for the item by communicating with an authority server that is separate from the signature server, wherein determining whether the user is authorized to request a signature for the item involves looking up an authorization for the user based upon an identifier for the user as well as an identifier for an application to which the user will send the signed item after it has been signed and returned by the signature server;
   looking up a private key for the user at the signature server based on the user identifier and the application identifier, wherein looking up a private key for the user based on the user identifier and application identifier, and wherein using the private key prevents a user who is allowed to access a second application, but who is not allowed to access the application being used, from gaining access to the application being used; and
   if the private key is found, signing the item with the private key for the user.

2. The method of claim 1, further comprising returning the signed item to the user so that the user can send the signed item to a recipient.

3. The method of claim 1, wherein the method further comprises configuring the signature server to accommodate a new user by:
   receiving a request from an authorized entity to add the new user;
   generating a key pair for the new user, including a new user private key and a new user public key;
   communicating with a certification authority to obtain a certificate for the new user based on the key pair; and
   storing the certificate and the key pair for the new user in a location that is accessible by the signature server to enable the signature server to sign items on behalf of the new user.

4. The method of claim 1, wherein the method further comprises configuring the signature server to delete an old user by:
   receiving a request from an authorized entity to delete the old user;
   notifying a certification authority to revoke a certificate for the old user; and
   removing the private key for the old user from the signature server, so that the signature server can no longer sign items on behalf of the old user.

5. The method of claim 1, wherein the method further comprises archiving the message and the signed item at the signature server.

6. The method of claim 1, wherein the method further comprises forwarding the signed item to an archive server in order to be archived.

7. A computer-readable storage medium storing instructions that when executed by a computer cause the computer to perform a method for facilitating the delegation of operations involved in providing digital signatures to a signature server, wherein the computer-readable storage medium is selected from a group consisting of magnetic and optical storage devices, disk drives, magnetic tape, CDs (compact discs), and DVDs (digital versatile discs or digital video discs), the method comprising:
   allowing a user to authenticate the signature server prior to sending a message to the signature server;
   receiving the message from the user at the signature server, the message including an item to be signed on behalf of the user by the signature server, a user identifier which identifies the user, and an application identifier which identifies the application being used;
   authenticating the user at the signature server;
   determining whether the user is authorized to request a signature for the item by communicating with an authority server that is separate from the signature server, wherein determining whether the user is authorized to request a signature for the item involves looking up an authorization for the user based upon an identifier for the user as well as an identifier for an application to which the user will send the signed item after it has been signed and returned by the signature server;
   looking up a private key for the user at the signature server based on the user identifier and the application identifier, wherein looking up a private key for the user based on the user identifier and application identifier, and wherein using the private key prevents a user who is allowed to access a second application, but who is not allowed to access the application being used, from gaining access to the application being used; and
   if the private key is found, signing the item with the private key for the user.

8. The computer-readable storage medium of claim 7, wherein the method further comprises returning the signed item to the user so that the user can send the signed item to a recipient.

9. The computer-readable storage medium of claim 7, wherein the method further comprises configuring the signature server to accommodate a new user by:
   receiving a request from an authorized entity to add the new user;
   generating a key pair for the new user, including a new user private key and a new user public key;
   communicating with a certification authority to obtain a certificate for the new user based on the key pair; and
   storing the certificate and the key pair for the new user in a location that is accessible by the signature server to enable the signature server to sign items on behalf of the new user.

10. The computer-readable storage medium of claim 7, wherein the method further comprises configuring the signature server to delete an old user by:
    receiving a request from an authorized entity to delete the old user;
    notifying a certification authority to revoke a certificate for the old user; and
    removing the private key for the old user from the signature server, so that the signature server can no longer sign items on behalf of the old user.

11. The computer-readable storage medium of claim 7, wherein the method further comprises archiving the message and the signed item at the signature server.

12. The computer-readable storage medium of claim 7, wherein the method further comprises forwarding the signed item to an archive server in order to be archived.

13. An apparatus that facilitates delegating operations involved in providing digital signatures, comprising:
   a signature server;
   an authentication mechanism that is configured to allow a user to authenticate the signature server prior to sending a message to the signature server
   a receiving mechanism within the signature server that is configured to receive the message from the user, the message including an item to be signed on behalf of the user by the signature server, a user identifier which identifies the user, and an application identifier which identifies the application being used;
   an authenticating mechanism configured to authenticate the user at the signature server;
   a determining mechanism configured to determine whether the user is authorized request a signature for the item by communicating with an authority server that is separate from the signature server, wherein determining whether the user is authorized to request a signature for the item involves looking up an authorization for the user based upon an identifier for the user as well as an identifier for an application to which the user will send the signed item after it has been signed and returned by the signature server;
   a lookup mechanism within the signature server that is configured to look up a private key for the user based on the user identifier and the application identifier, wherein looking up a private key for the user based on the user identifier and application identifier, and wherein using the private key prevents a user who is allowed to access a second application, but who is not allowed to access the application being used, from gaining access to the application being used; and
   a signing mechanism within the signature server that is configured to sign the item with the private key for the user if the private key is found.

14. The apparatus of claim 13, further comprising a sending mechanism within the signature server that is configured to return the signed item to the user so that the user can send the signed item to a recipient.

15. The apparatus of claim 13, further comprising an initialization mechanism that is configured to:
   receive a request from an authorized entity to add a new user;
   generate a key pair for the new user, including a new user private key and a new user public key;
   communicate with a certification authority to obtain a certificate for the new user based on the key pair; and to
   store the certificate and the key pair for the new user in a location that is accessible by the signature server to enable the signature server to sign items on behalf of the new user.

16. The apparatus of claim 13, further comprising a deletion mechanism that is configured to:
   receive a request from an authorized entity to delete an old user;
   notify a certification authority to revoke a certificate for the old user; and to
   remove the private key for the old user from the signature server, so that the signature server can no longer sign items on behalf of the old user.

17. The apparatus of claim 13, further comprising an archiving mechanism that is configured to archive the message and the signed item at the signature server.

18. The apparatus of claim 13, further comprising an archiving mechanism that is configured to forward the signed item to an archive server in order to be archived.

* * * * *